(12) United States Patent
Van Der Merwe et al.

(10) Patent No.: US 7,876,850 B2
(45) Date of Patent: Jan. 25, 2011

(54) WIRELESS COMMUNICATION SYSTEM WITH DIVERSITY/MIMO ARRAY BRANCH DECOUPLING

(75) Inventors: Jaco Van Der Merwe, Son & Breugel (NL); Petrus Alphons Beeckman, Geldrop (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 662 days.

(21) Appl. No.: 11/570,155

(22) PCT Filed: Jun. 6, 2005

(86) PCT No.: PCT/IB2005/051835

§ 371 (c)(1),
(2), (4) Date: Dec. 7, 2006

(87) PCT Pub. No.: WO2005/122427

PCT Pub. Date: Dec. 22, 2005

(65) Prior Publication Data

US 2007/0258539 A1   Nov. 8, 2007

Related U.S. Application Data

(60) Provisional application No. 60/578,362, filed on Jun. 8, 2004.

(51) Int. Cl.
*H04B 7/02* (2006.01)
(52) U.S. Cl. ..................................................... 375/267
(58) Field of Classification Search ................ 375/267, 375/299, 347, 349; 700/53; 455/101, 132–141
See application file for complete search history.

(56) References Cited

U.S. PATENT DOCUMENTS

2005/0136841 A1 * 6/2005 Frank ........................... 455/65

FOREIGN PATENT DOCUMENTS

| WO | 02054626 A1 | 7/2002 |
|----|-------------|--------|
| WO | 2004013993 A1 | 2/2004 |
| WO | 2004019477 A1 | 3/2004 |

OTHER PUBLICATIONS

Humphrey, D.E.J. "Eigenvalue Mode Confirmation in a Mutually Coupled Active Antenna Chain Array", Sep. 9, 1996, European Microwave Conference 1996, pp. 614-617.

* cited by examiner

*Primary Examiner*—Sam K Ahn (57) ABSTRACT

A method and device for determining decoupled signal parameters of received signals associated with individual antenna elements of an antenna array is disclosed. The method comprises the steps of determining a receiving characteristic of the antenna array, establishing an identity characteristic associated with the antenna array, the identity characteristic independently defining each of the plurality of antenna elements, and determining a decoupled signal parameter of the received signals in view of the receiving characteristic, the identity characteristic and a coupled current associated with said received signals. The device comprises a memory and a processor in communication with the memory for executing code for processing coupled signal inputs in view of a receiving characteristic and an identity characteristic of the antenna array, wherein the receiving characteristic includes a measure of coupling among the antenna elements and the identity characteristic independently identifies each of the antenna elements.

24 Claims, 6 Drawing Sheets

FIG. 6

WIRELESS COMMUNICATION SYSTEM WITH DIVERSITY/MIMO ARRAY BRANCH DECOUPLING

This application relates to wireless communication systems and, more particularly to multiple input-multiple output (MIMO) and diversity antenna array systems.

In spatial diversity wireless communications systems an array of antenna elements are used to receive the same signal. The idea is that each element or branch in the antenna array intercepts and processes a different channel with different fading characteristics. Hence, the system performance may be enhanced by processing out the fading characteristics. In multiple-input, multiple-output (MIMO) space-time systems a similar array of antenna elements is used at the receiver as well as the transmitter, and the objective is to transmit parallel signals simultaneously over parallel channels. Both methods can therefore be used to increase the total system throughput. However, the efficiency of both methods depends on the level of correlation between the branches. Typically, the level of branch to branch correlation should be as low as possible. A major contribution to this branch correlation is coupling between the branch antenna elements.

Consideration of the coupling between elements of a diversity array is neglected in most design procedures as it introduces a significant level of complexity in the computation. However, diversity applications require sufficiently de-correlated or de-coupled branches. For example, in automotive rooftop applications, the lack of space require very closely spaced elements, thereby increasing the branch correlation to the extent that the diversity gain achieved using multiple antennas is reduced to a very low level.

Branch de-correlation is also a sought-after property in Space-Time Coding and MIMO applications and has been intensely investigated. A lower correlation between array branches further allows for a larger number of orthogonal channels. One method to reduce correlation between neighboring elements is described in published patent applications WO2002054626 and US20020085643. In this method spatially alternating polarizations is used among individual antenna elements.

Some Doppler shift mitigation schemes also requires array element decoupling i.e. that the array branches be essentially identical. However, producing identical array branches is difficult and significant degradation of received signals due to Doppler shift must be tolerated.

Thus, there is a need in the industry for a simpler method to obtain an antenna array whose branch antenna elements are completely decoupled and have substantially identical receive/radiation patterns.

A method and device for determining decoupled signal parameters from received signals associated with individual antenna elements of an antenna array is disclosed. The method comprises the steps of determining a receiving characteristic of the antenna array, establishing an identity characteristic associated with the antenna array, the identity characteristic independently defining each of the plurality of antenna elements, and determining a decoupled current of the received signals in view of the receiving characteristic, the identity characteristic and a coupled signal parameter associated with said received signals. In one aspect of the invention, the receiving characteristic is based on the antenna array configuration and predetermined. The signal parameter may be a current or a voltage. The device is connected to a receiving system, which is connected to the antenna array, may comprise a memory and a processor in communication with the memory for executing code for processing the coupled current inputs in view of a receiving characteristic and an identity characteristic of the antenna array, wherein the receiving characteristic includes a mea sure of coupling among the antenna elements and the identity characteristic independently identifies each of said antenna elements.

FIGS. 4b and 4c illustrate an example of the improvement in the effective antenna radiation pattern of one of the outer elements of the antenna configuration shown in FIG. 4a;

FIGS. 5a and 5b illustrate a second example of the improvement in the effective antenna radiation pattern of the center element of the antenna configuration shown in FIG. 4a.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have be en used to identify similar elements.

Figure 1:
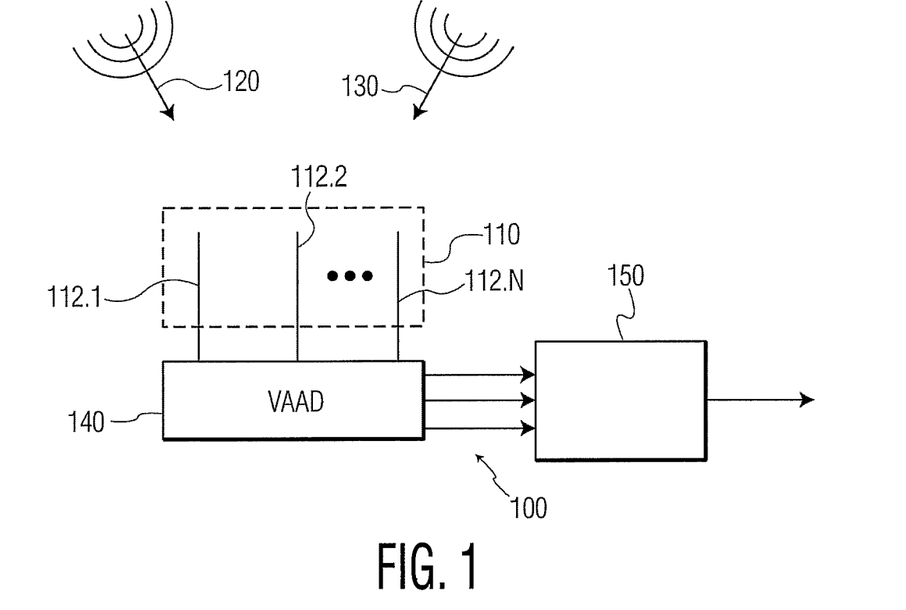
FIG. 1 illustrates a block diagram of a receiving system in accordance with the present invention.

FIG. 1 illustrates a block diagram of an exemplary system for decoupling dipole or monopole antenna array elements according to the principles of the invention. As shown, antenna array 110 comprising N antenna elements, referred to as 112.1-112.N, receive primary beam 120 and at least one reflected beam 130. Reflected beam 130 may, as is known, be caused by the reflection of primary beam 130 off, for example, a surrounding building. This is conventionally referred to as multi-path and causes interference to the reception of the primary beam.

Signal energy from primary signal 120 and reflected signal 130 are intercepted by each antenna element 112.1-112.N and provided to VAAD (Virtual Antenna Array Decoupler) 140. VAAD 140 processes the received signal energy in a manner that decouples the deformation effect on the receive antenna pattern, caused by the relatively close-spacing of the antenna elements 112.1-112.N, and provides the decoupled signals to the spatial diversity processor 150 for subsequent processing, e.g., removing interference caused by reflected beam 130. Note that the decoupled signals at the input of the spatial diversity processor 150 are still all weighted sums of both the primary beam 120 and the reflected beam 130.

The decoupling process of the VAAD 140 may be recognized by those skilled in the art in that the terminal currents in an array of antenna elements due to terminal or field excitation may be calculated as:

$$\sum_{n=1}^{N} I_n Z_{mn} = V_m \quad [1]$$

where N is the number of antenna elements;
$I_n$ is the current at the terminals of element n; and
$Z_{mn}$ is the mn$^{th}$ element of the square, open-circuit impedance matrix characterizing the array.

Equation 1 may be represented in matrix form as:

$$Z_c I_c = V_c \quad [2]$$

where
$V_c$ is a vector related to the incident electric field component parallel to the individual dipoles in the absence of all dipoles;
$I_c$ is a vector representative of the array element terminal currents; and
$Z_c$ is a full, open-circuit impedance matrix characterizing the coupling between the individual elements. The subscript "c" refers to the antenna elements being coupled.

An open-circuit impendence matrix, $Z_u$, may be formulated as a diagonal matrix representative of a virtual antenna array, i.e., virtual antenna identity characteristic, wherein only one element is present at any moment and each element is therefore decoupled from all adjacent elements. The decoupled terminal current of the virtual antenna array, similar to equation 2, may therefore be represented as:

$$Z_u I_u = V_u \quad [3]$$

The field excitation vectors, $V_c$ and $V_u$ may now be equated as they are identical and both related to the electric field parallel to the array elements in the absence of any antenna elements as:

$$Z_u I_u = Z_c I_c \quad [4]$$

And the decoupled current associated with the virtual array may therefore be expressed as:

$$I_u = Z_u^{-1} Z_c I_c \quad [5]$$

where
$I_u$ is the required decoupled output current vector;
$Z_u^{-1}$ is the matrix inverse of an decoupled (diagonal), virtual, antenna array open-circuit impedance matrix;
$Z_c$ is the actual coupled (full) antenna array open-circuit impedance matrix; and
$I_c$ is the actual array output current vector.

As one skilled in the art would recognize, impedance matrices $Z_u$ and $Z_c$ may be obtained through theoretical expressions, simulations or actual measurements of the antenna arrays. Hence, the antenna array characteristics may be predetermined or determined based on conventional methods of measurements. As one skilled in the art would recognize, the proposed method is not limited to monopole/dipole arrays, but extendable to any array.

Furthermore, although reference is made herein with regard to coupled and decoupled currents, it would be within the skill of those practicing in the art to implement the operations shown in Equation 5 with regard to voltages once a set of array terminating impedances has been specified. Such usage of voltage has been contemplated and considered to be within the scope of the invention.

The decoupling processing performed by the VAAD 140 may include a digital signal processor or dedicated, passive, electronic hardware. Further, the processing performed by the VAAD 140 may be performed at radio (RF), or at intermediate (IF) frequencies.

Figure 2:
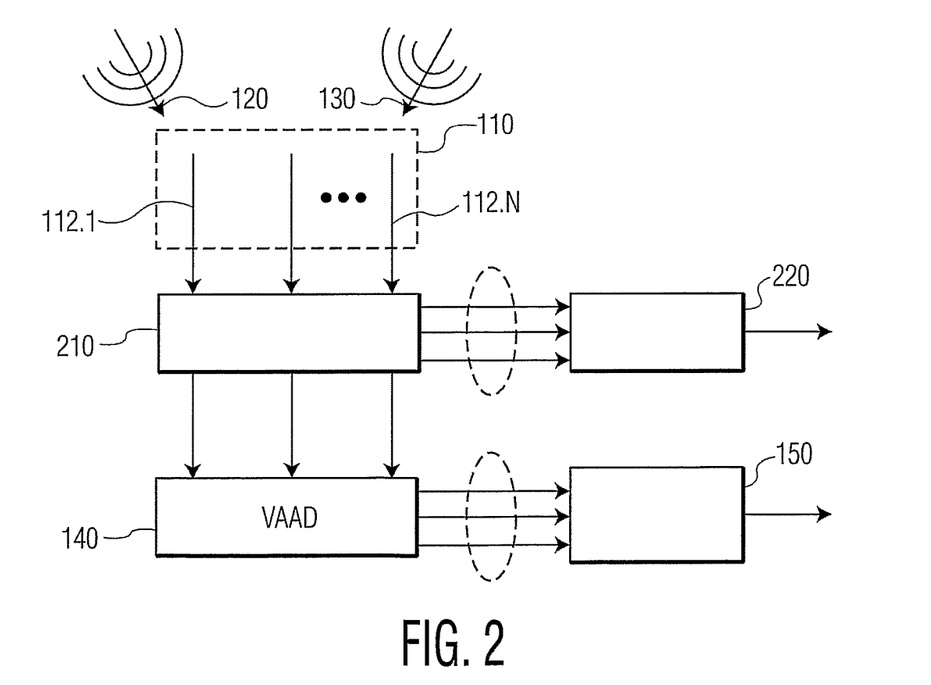
FIG. 2 illustrates a block diagram of a receiving system incorporating the instant invention.

FIG. 2 illustrates an embodiment of the present invention incorporated into a conventional receiving system. In this illustrative embodiment, antenna array 110 includes antenna elements 112.1-112.N as previously described. The output of each antenna element is provided to power splitter 210, wherein the provided signal energy is divided between a conventional multi-beam processor 220 and the VAAD 140. The coupled signals provided to multi-beam processor 220 are processed using known conventional methods, which need not be discussed in detail herein. The signal energy provided to the VAAD 140 is processed in accordance with processing described in equation 5 and discussed with regard to FIG. 1.

Figure 3:
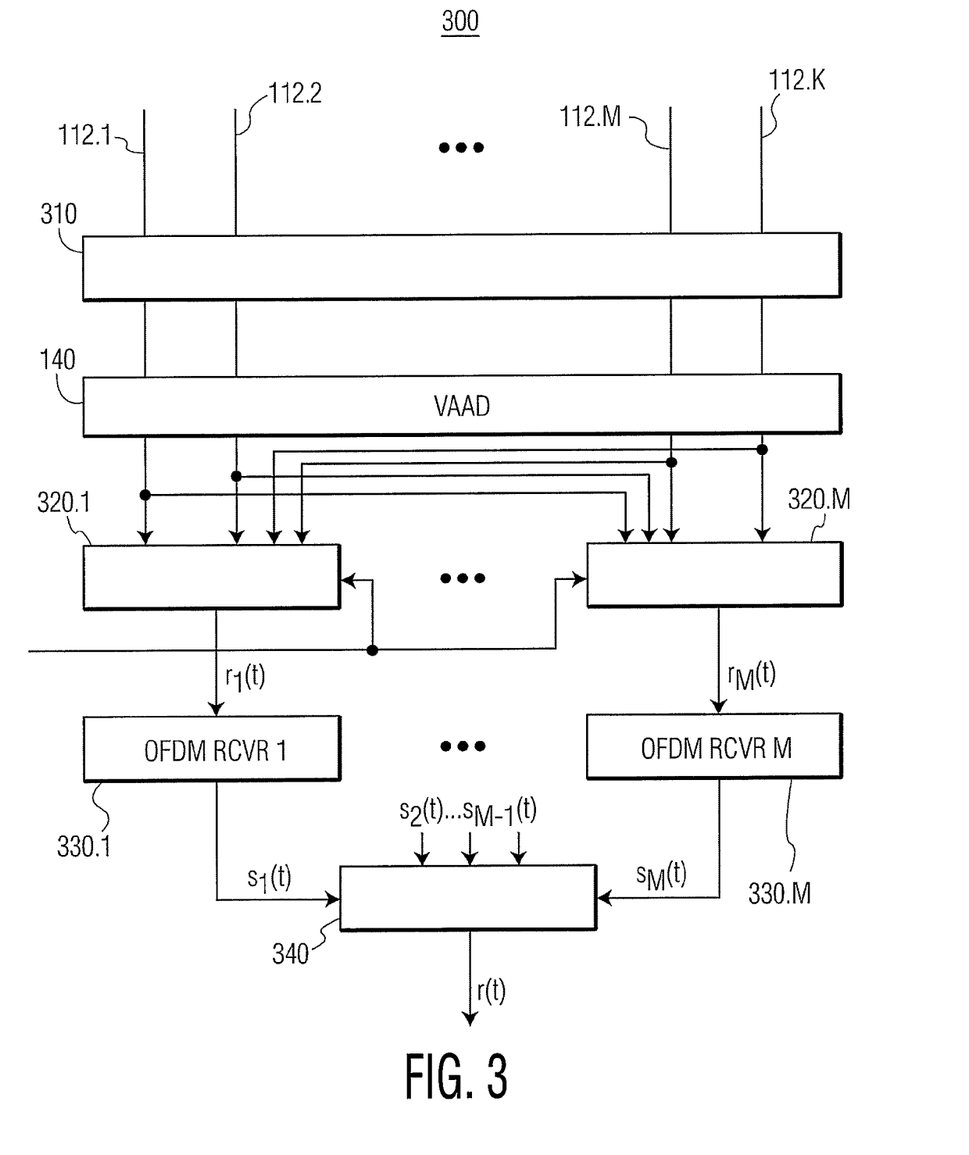
FIG. 3 illustrates a block diagram of a second OFDM receiving system incorporating the instant invention to mitigate Doppler shift.

FIG. 3 illustrates an embodiment of the present invention incorporated into a conventional spatial diversity receiving system similar to that described in "Novel Fast Fading Compensator for OFDM using Space Diversity with Space-Domain Interpolator", H. Takayanagi, 2001 Conference Vehicular Technology VTC 2001. October 2001. This spatial diversity receiving system is suitable for mitigation of Doppler shift in mobile applications. In this illustrative embodiment, K-element linear array 310 receives signal energy from K antenna elements, 112.1-112.K. The signal energy from each element is provided to the VAAD 140 for decouple processing as represented by equation 5. The signal energy is applied to each of M minimum mean square error (MM SE) interpolators, 320.1-320.M, which produces respective outputs $r_1(t)$-$r_M(t)$. Outputs $r_1(t)$-$r_M(t)$ are then applied to corresponding OFDM receivers 330.1-330.M and their outputs, $s_1(t)$-$s_M(t)$ are applied to MRC diversity combiner 340 to produce a resultant signal output r(t).

Figure 4A:
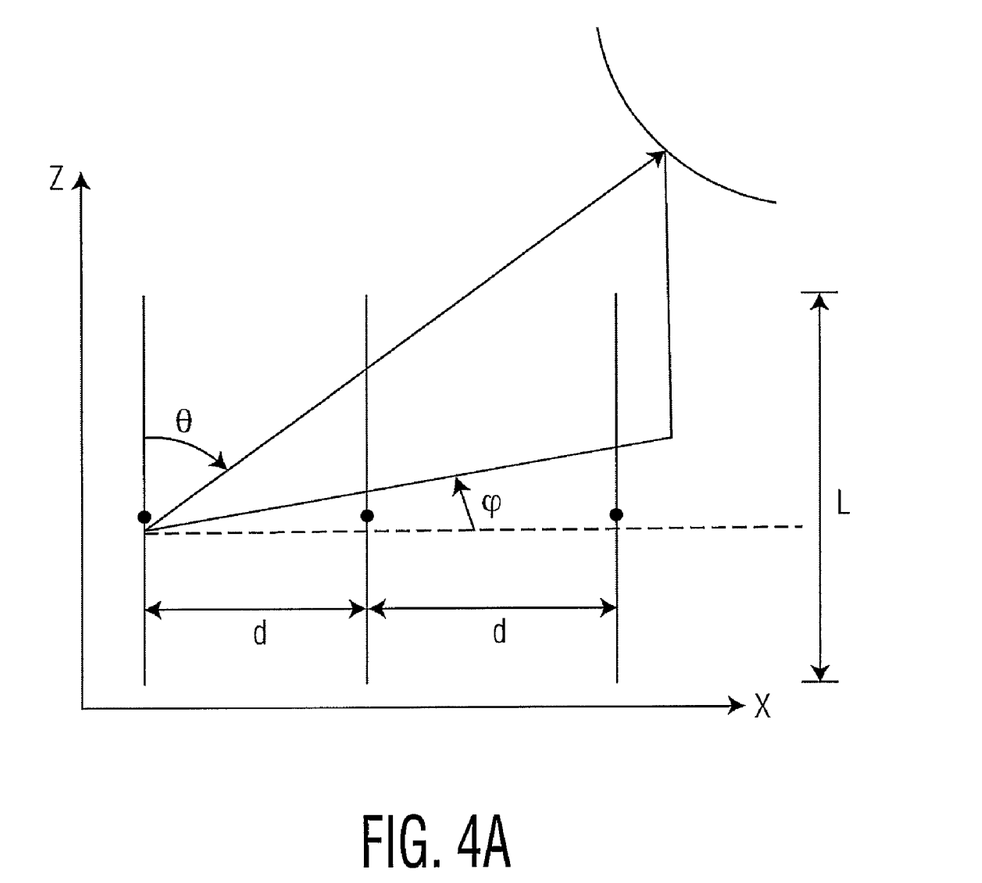
FIG. 4a illustrates a conventional three-element dipole antenna configuration.

FIG. 4a illustrates a three element dipole antenna array configuration wherein the dipole elements are spaced at a distance, d=15 centimeters (cm), and are 2×7.5 cm long. The incidence angles, θ and φ of the incident plane wave are swept and the terminal response of the three dipoles is obtained during numerical simulations.

Figure 4B:
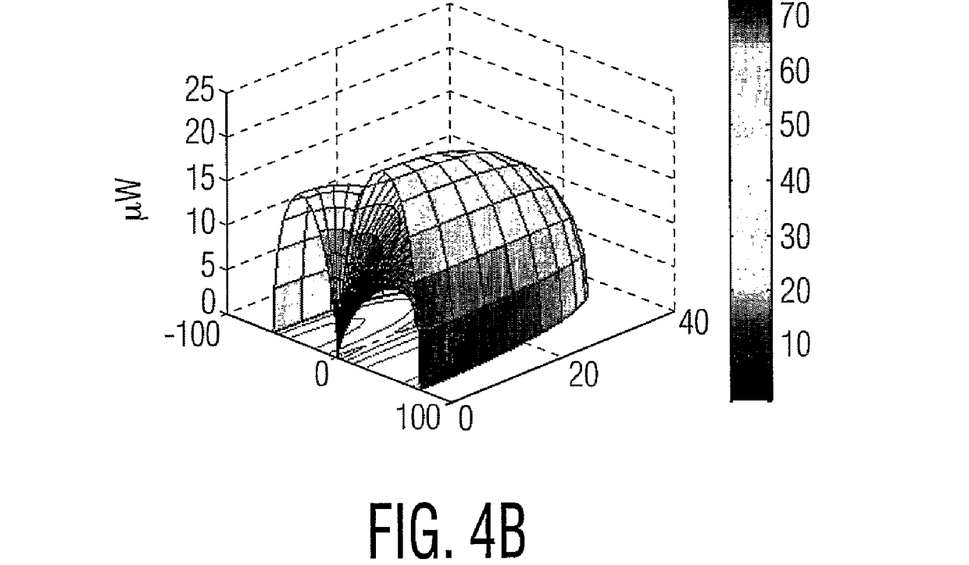
Figure 4C:
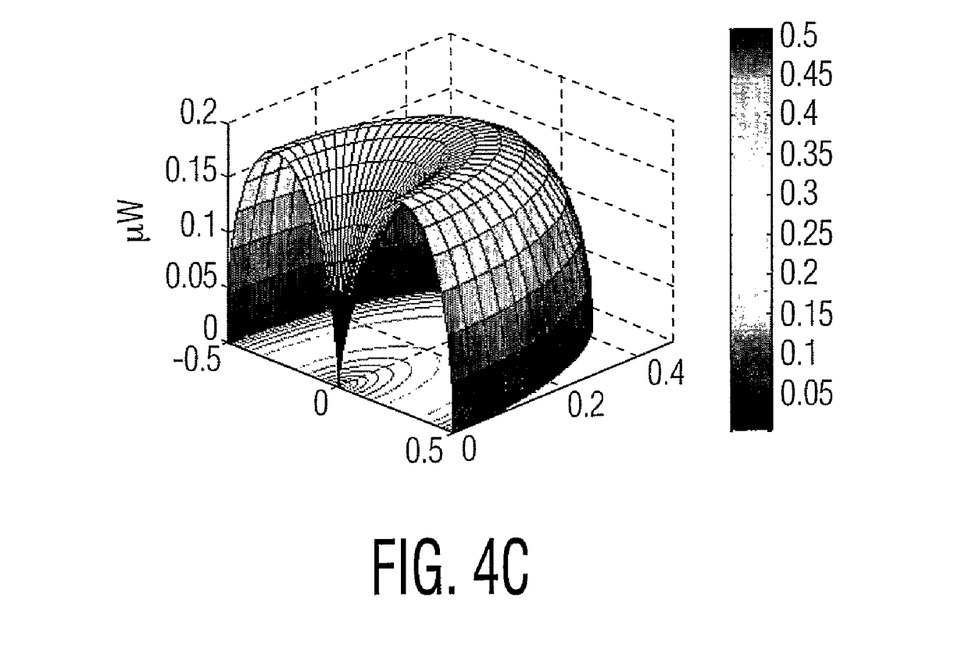

FIG. 4b illustrates a received power pattern of the first dipole element of a 3-element array at a frequency of 400 MHz for the antenna configuration shown in FIG. 4c.

In this case, the proximity of adjacent antennas causes the pattern of the first dipole element to be non-symmetrical. FIG. 4c illustrates a renormalization of the received power pattern shown in FIG. 4b resulting from the processing described by equation 5.

Figure 5A:
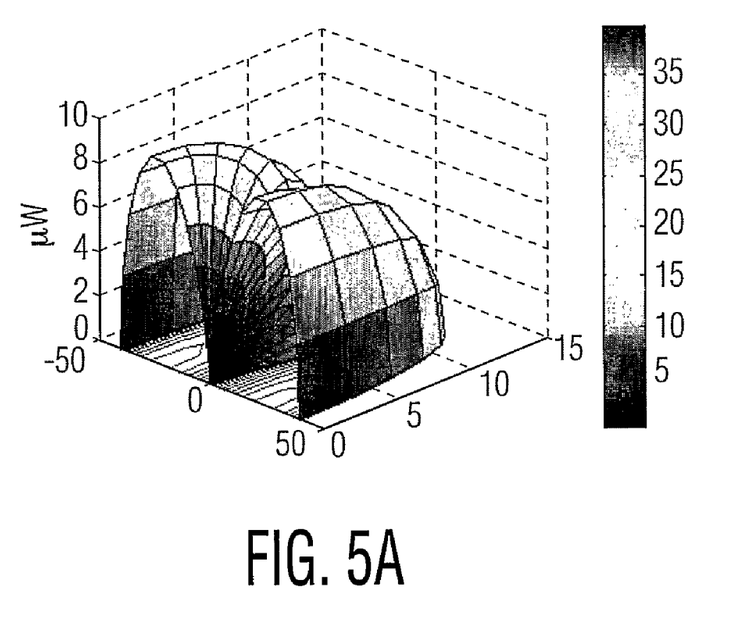
Figure 5B:
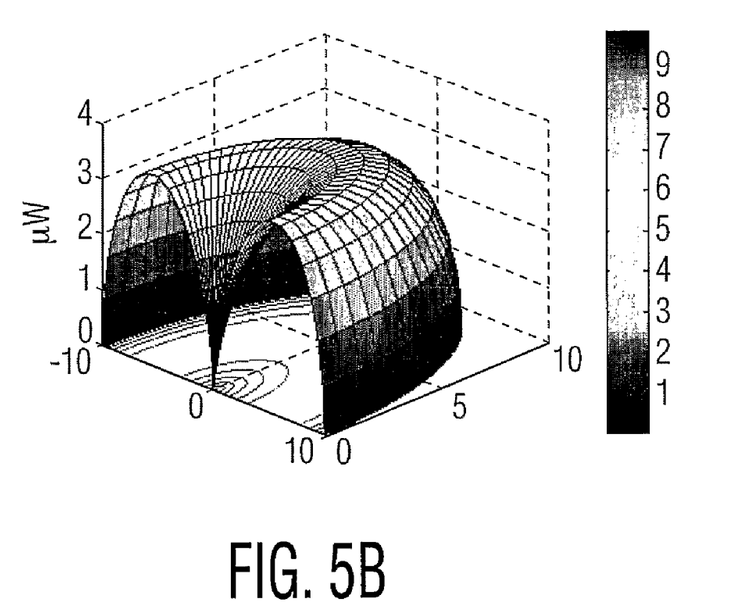

FIG. 5a illustrates an antenna pattern of the second dipole element at a frequency of 800 MHz for an antenna configuration shown in FIG. 4a. In this case, the symmetry in the location of adjacent antenna elements causes the received power pattern to be more symmetric (but still distorted) than that shown in FIG. 4b. FIG. 5b illustrates a renormalization of the pattern shown in FIG. 5a resulting from the processing described by equation 5.

Figure 6:
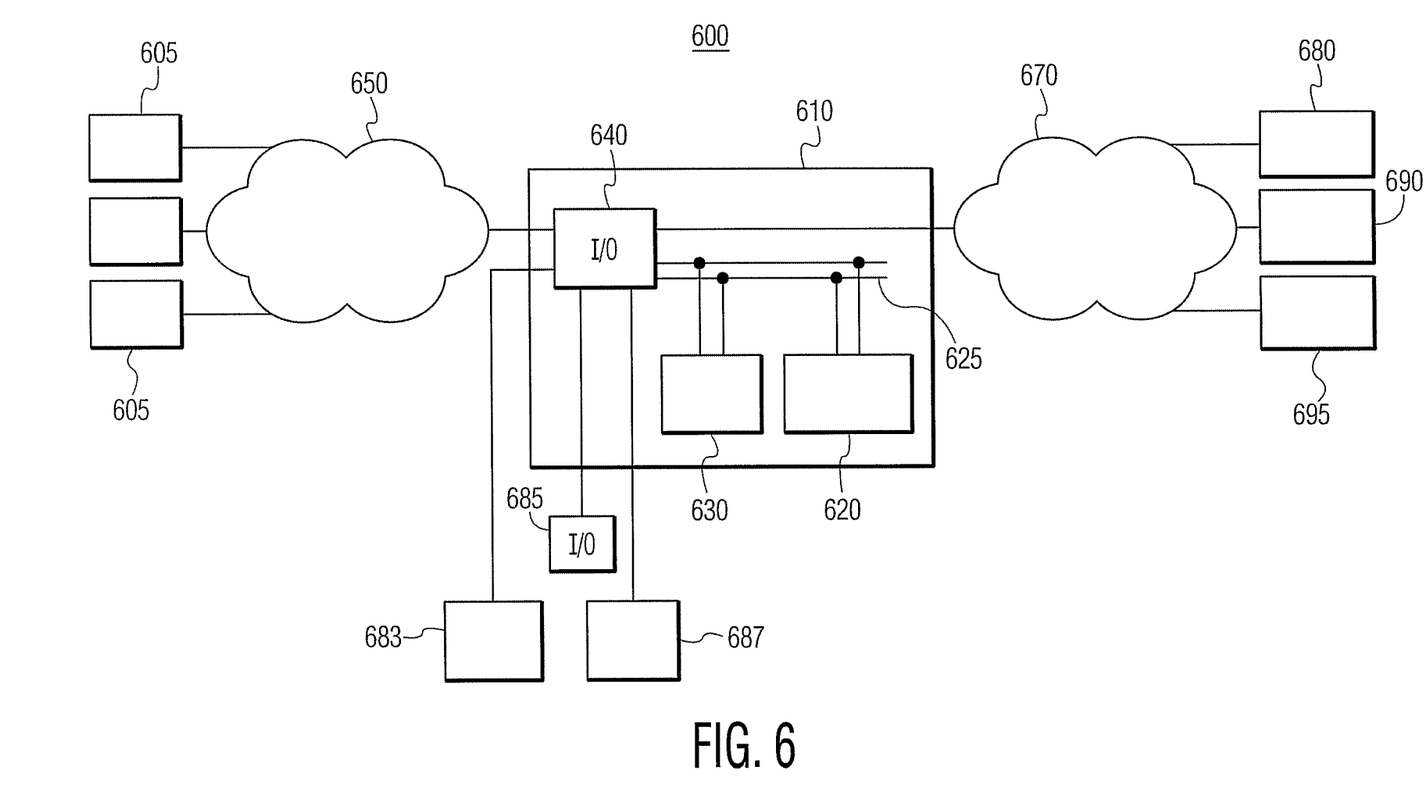
FIG. 6 illustrates a system for implementing the processing in accordance with the principles of the invention.

FIG. 6 illustrates a system 600 for implementing the principles of the invention as shown in FIGS. 1-3. In this exemplary system embodiment, input data is received from antenna array elements 605 over network 650 and processed in accordance with one or more algorithms, either software or firmware, executed by processing system 610. The results of processing system 610 may then be transmitted over network 670 for viewing on display 680, reporting device 690 and/or a second processing system 695.

More specifically, processing system 610 includes one or more input/output devices 640, i.e., receivers, that receive signal energy from the illustrated antenna elements 605 over network 650. The received signal energy is then applied to processor 620, which is in communication with input/output device 640 and memory 630. Input/output devices 640, processor 620 and memory 630 may communicate over a communication medium 625. Communication medium 625 may represent a communication network, e.g., ISA, PCI, PCMCIA bus, one or more internal connections of a circuit, circuit card or other device, as well as portions and combinations of these and other communication media or a waveguide or cable suitable for transferring signal energy at radio or intermediate frequencies or an optical fiber suitable for transferring signal energy at an optical frequency. Processing system 610 and/or processor 620 may be representative of a special purpose or general purpose processing system, as well as portions or combinations of these and other devices that can perform the operations illustrated.

Processor 620 may be a central processing unit (CPU) or dedicated hardware/software, such as a PAL, ASIC, FGPA, operable to execute computer instruction code or a combination of code and logical operations. In one embodiment, processor 620 may include code which, when executed, performs the operations shown in equation 5. The code may be contained in memory 630, may be read or downloaded from a memory medium such as a CD-ROM or floppy disk, 683, may be provided by a manual input device 685, such as a keyboard or a keypad entry, or may be read from a magnetic or optical medium 687 when needed. Information items provided by input device 683, 685 and/or 687 may be accessible to processor 620 through input/output device 640, i.e., digital inputs, or may be provided directly to processor 620. Further, the data received by input/output device 640 may be immediately accessible by processor 620 or may be stored in memory 630. Processor 620 may further provide the results of the processing to display 680, recording device 690 or a second processing unit 695.

As one skilled in the art would recognize, the terms processor, processing system, computer or computer system may represent one or more processing units in communication with one or more memory units and other devices, e.g., peripherals, connected electronically to and communicating with at least one processing unit. Furthermore, the devices illustrated may be electronically connected to one or more processing units via internal busses, e.g., serial, parallel, ISA bus, microchannel bus, PCI bus, PCMCIA bus, USB, etc., or one or more internal connections of a circuit, circuit card or other device, waveguides as well as portions and combinations of these and other communication media, or an external network, e.g., the Internet and Intranet, or waveguides. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. As will be appreciated, networks 650 and 670 may also be internal networks or one or more internal connections of a circuit, circuit card or other device, as well as portions and combinations of these and other communication media such as waveguides or cables for transmission of RF and/or IF signal energy or optical cable for transfer of optical signal energy.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A method for decoupling signal parameters received by an antenna array containing a plurality of antenna elements, said method comprising the steps of:
   determining, by a decoupling processor, a receiving characteristic of said antenna array;
   establishing, by the decoupling processor, an identity characteristic associated with said antenna array, said identity characteristic independently defining a signal characteristic component for each of said plurality of antenna elements by processing a received signal for each antenna element; and
   determining, by the decoupling processor, a decoupled signal parameter vector of said received signals in view of said receiving characteristic, said identity characteristic and a coupled signal parameter vector associated with said received signals.

2. The method as recited in claim 1, wherein said receiving characteristic is predetermined.

3. The method as recited in claim 2, wherein said receiving characteristic is based on the configuration of said antenna array.

4. The method as recited in claim 3, wherein said receiving characteristic is determined by a method selected from the group consisting of: theoretical expressions, simulations or actual measurements.

5. The method as recited in claim 1, wherein said identity characteristic is predetermined.

6. The method as recited in claim 5, wherein said identity characteristic is based on the configuration of said antenna array.

7. The method as recited in claim 1, wherein said signal parameter(s) received by the antenna array is selected from the group consisting of: current and voltage.

8. A device for determining a decoupled parameter of signals received by an antenna array containing a plurality of antenna elements, said device comprising:
   a memory;
   a processor in communication with said memory, said processor operable for executing code for:
   determining a receiving characteristic associated with said antenna array;
   establishing an identity characteristic associated with said antenna array, said identity characteristic independently identifying a signal characteristic component for each of said plurality of antenna elements by processing a received signal for each antenna element; and
   determining said decoupled signal parameter in view of said receiving characteristic, said identity characteristic and a coupled signal parameter associated with said received signals.

9. The device as recited in claim 8, wherein said receiving characteristic is predetermined.

10. The device as recited in claim 9, wherein said receiving characteristic is determined by the configuration of said antenna array.

11. The device as recited in claim 8, wherein said identity characteristic is predetermined.

12. The device as recited in claim 11, wherein said identity characteristic is determined by the configuration of said antenna array.

13. The device as recited in claim 8, wherein said code is stored in said memory.

14. The device as recited in claim 8, further comprising:
an input/output device in communication with said memory and said processor.

15. The device as recited in claim 8, wherein the signal parameter is selected from the group consisting of: current and voltage.

16. A system, comprising:
an antenna array including a plurality of antenna elements;
a receiving system connected to said antenna array, said receiving system providing coupled signal parameter inputs,
a processing device receiving said coupled signal parameter inputs and determining decoupled signal parameter outputs comprising:
a memory; and
a processor in communication with said memory for executing code for:
processing said coupled signal parameter inputs in view of a receiving characteristic and an identity characteristic of said antenna array, wherein said receiving characteristic includes a measure of coupling among said antenna elements and said identity characteristic independently identifies a signal characteristic component for each of said antenna elements by processing a signal for each antenna element.

17. The system as recited in claim 16, wherein said receiving characteristic is predetermined.

18. The system as recited in claim 17, wherein said receiving characteristic is based on the configuration of said antenna array.

19. The system as recited in claim 17, wherein said receiving characteristic is determined by a method selected from the group consisting of: theoretical expressions, simulations or actual measurements.

20. The system as recited in claim 16, wherein said identity characteristic is predetermined.

21. The system as recited in claim 20, wherein said identity characteristic is based on the configuration of said antenna array.

22. The system as recited in claim 16, wherein said code is stored in said memory and accessible by said processor, wherein said code provides operational instructions for said processor.

23. The system as recited in claim 16, further comprising:
an input/output device in communication with said memory and said processor.

24. The system as recited in claim 16, wherein the signal parameter is selected from the group consisting of: current and voltage.

* * * * *